United States Patent
Forget

(10) Patent No.: US 10,073,321 B2
(45) Date of Patent: Sep. 11, 2018

(54) SYSTEM FOR GENERATING SHORT OPTICAL PULSES OF A DURATION SHORTER THAN THE PERIOD OF THE OPTICAL CARRIER USING THE PRINCIPLE OF PARAMETRIC AMPLIFICATION

(71) Applicant: FASTLITE, Valbonne (FR)

(72) Inventor: Nicolas Forget, Nice (FR)

(73) Assignee: FASTLITE, Valbonne (FR)

(*) Notice: Subject to any disclaimer, the term of this patent is extended or adjusted under 35 U.S.C. 154(b) by 20 days.

(21) Appl. No.: 15/100,003

(22) PCT Filed: Nov. 28, 2014

(86) PCT No.: PCT/FR2014/053081
§ 371 (c)(1),
(2) Date: May 27, 2016

(87) PCT Pub. No.: WO2015/079187
PCT Pub. Date: Jun. 4, 2015

(65) Prior Publication Data
US 2017/0031232 A1    Feb. 2, 2017

(30) Foreign Application Priority Data

Nov. 28, 2013  (FR) .................................... 13 61742
Nov. 28, 2014  (FR) .................................... 14 61638

(51) Int. Cl.
*G02F 1/39*   (2006.01)
*G02F 1/37*   (2006.01)
(Continued)

(52) U.S. Cl.
CPC ............... *G02F 1/39* (2013.01); *G02F 1/116* (2013.01); *G02F 1/353* (2013.01); *G02F 1/37* (2013.01);
(Continued)

(58) Field of Classification Search
CPC . G02F 1/116; G02F 1/353; G02F 1/37; G02F 1/39; G02F 2001/3507;
(Continued)

(56) References Cited

U.S. PATENT DOCUMENTS 3,281,766 A * 10/1966 Bridges ................. H04B 11/00
329/311
6,947,123 B1 * 9/2005 Ohtsuki .............. G03F 7/70025
355/67
(Continued)

FOREIGN PATENT DOCUMENTS

WO   2005/112207 A1   11/2005

OTHER PUBLICATIONS

Dorrer, C., et al: "High-Contrast Optical-Parametric Amplifier as a Front End of High-Power Laser Systems", Optics Letters, Optical Society of America, vol. 32, No. 15, Aug. 1, 2007 (Aug. 1, 2007), pp. 2143-2145, XP001506852, ISSN: 146-9592, DOI: 10.1364/OL. 32.002143.
(Continued)

Primary Examiner — Loha Ben
(74) Attorney, Agent, or Firm — Young & Thompson

(57) ABSTRACT

A generator of short optical pulses includes:
a generator of optical pulses with a wavelength equal to $\lambda/2$ and a spectral width less than $\lambda/3$;
a generator of optical pulses of a duration less than 10 picoseconds at a wavelength $\lambda/3$;
a device for recombining the pulses from the generators;
a parametric amplification device receiving the output of the recombination device as input;
a filter extracting, from the output of the amplification device, a band centered about a wavelength $\lambda$;
a second harmonic generator receiving the output of the filter and generating a band centered over a wavelength $\lambda/2$; and (Continued)

Figure 1:
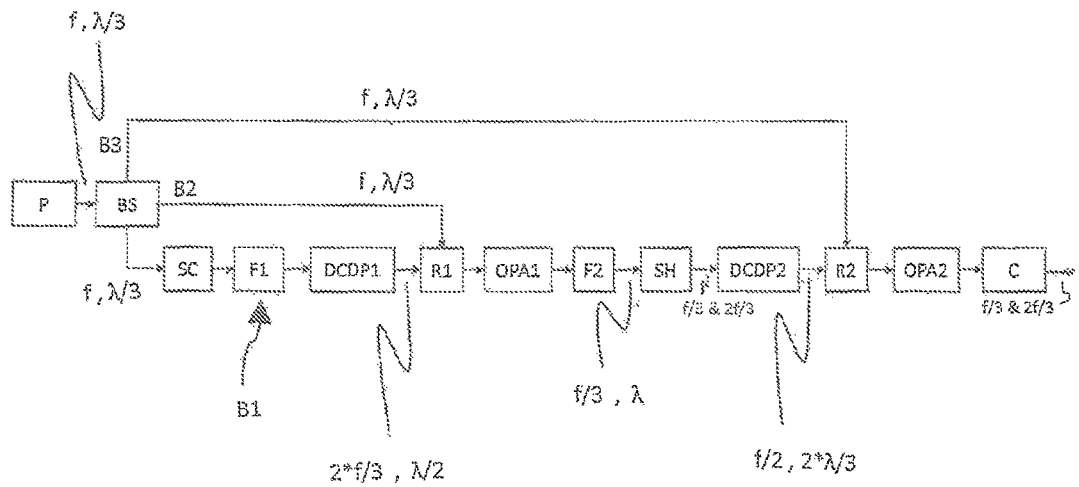

a programmable device making it possible to temporally adjust the pulses corresponding to the bands, in order to allow for the generation of a pulse with a wavelength equal to $\lambda/3$ and of a duration less than the period of the optical cycle.

14 Claims, 1 Drawing Sheet

(51) Int. Cl.
　　　$G02F\ 1/35$　　　(2006.01)
　　　$G02F\ 1/11$　　　(2006.01)
　　　$H01S\ 3/00$　　　(2006.01)
　　　$H01S\ 3/10$　　　(2006.01)

(52) U.S. Cl.
　　　CPC ........... $G02F\ 2001/3507$ (2013.01); $G02F\ 2001/392$ (2013.01); $G02F\ 2203/26$ (2013.01); $H01S\ 3/0057$ (2013.01); $H01S\ 3/0092$ (2013.01); $H01S\ 3/10$ (2013.01)

(58) Field of Classification Search
　　　CPC ........... G02F 2001/392; G02F 2203/26; H01S 3/005; H01S 3/0057; H01S 3/0085; H01S 3/0092; H01S 3/10
　　　USPC ....... 359/237, 238, 245, 278, 279, 285, 287, 359/264, 325, 328, 331, 337, 337.1, 359/337.2, 337.22, 337.4; 372/18, 24–26
　　　See application file for complete search history.

(56) References Cited

U.S. PATENT DOCUMENTS

| | | | | |
|---|---|---|---|---|
| 7,212,275 | B2* | 5/2007 | Ohtsuki | G03F 7/70025 355/67 |
| 7,567,596 | B2* | 7/2009 | Dantus | G01J 11/00 250/281 |
| 7,576,907 | B1* | 8/2009 | Bartels | H01S 3/0057 359/279 |
| 7,583,710 | B2* | 9/2009 | Dantus | H01J 49/162 250/281 |
| 8,208,504 | B2* | 6/2012 | Dantus | G01N 21/6402 250/281 |
| 8,861,075 | B2* | 10/2014 | Dantus | H01S 3/005 359/337.5 |
| 9,207,183 | B2* | 12/2015 | Ozeki | G01N 21/65 |

OTHER PUBLICATIONS

Li, Y Y, et al: "Carrier-envelope phase stabilized high temporal contrast femtosecond laser source at 1053 nm", Laser Physics Letters, vol. 10, No. 7, May 23, 2013 (May 23, 2013), pp. 075403 (4 pages), XP055167016, ISSN: 1612-2011, DOI: 10.1088/1612-2011/10/7/075403.

Adachi, S., et al: "1.5 MJ, FS Parametric Chirped-Pulse Amplification System at 1 KHZ", Optics Letters, Optical Society of America, US, vol. 32, No. 17, Sep. 1, 2007 (Sep. 1, 2007), pp. 2487-2489, XP001507574, ISSN: 0146-9592, DOI: 10.1364/OL. 32.002487.

Mucke, O. D., et al: "Infrared multimillijoule single-filament supercontinuum generation", Lasers and Electro-Optics, 2009 and 2009 Conference on Quantum Electronics and Laser Science Conference. CLEO/QELS 2009. Conference on, IEEE, Piscataway, NJ, USA, Jun. 2, 2009 (Jun. 2, 2009), pp. 1-2, XP031521863, ISBN: 978-1-55752-869-8.

Bradler, M., et al: "Mid-IR femtosecond pulse generation on the microjoule level up to 5 μm at high repetition rates", Optics Letters, Optical Society of America, US, vol. 36, No. 21, Nov. 1, 2011 (Nov. 1, 2011), pp. 4212-4214, XP001570750, ISSN: 0146-9592, [retrieved on Oct. 25, 2011], DOI: 10.1364/OL.36.004212.

International Search Report, dated Mar. 18, 2015, from corresponding PCT Application.

\* cited by examiner

SYSTEM FOR GENERATING SHORT OPTICAL PULSES OF A DURATION SHORTER THAN THE PERIOD OF THE OPTICAL CARRIER USING THE PRINCIPLE OF PARAMETRIC AMPLIFICATION

This invention relates to a generator and a method for generating optical pulses with a duration shorter than the optical cycle in infrared.

This device and this method apply in particular to the simultaneous, collinear and coherent parametric optical amplification of two harmonic pulses of the same polarisation.

Generally, it is known that pulsed laser sources are characterised by a temporal confinement of the light emission. It is usual to describe the electrical field of these pulses in terms of envelope and carrier: an electrical field is then the product of an oscillating field with a period noted as $T_0=\lambda_0/c$ (optical carrier) by a slowly varying function on the scale of $T_0$ (envelope). For ultrafast laser sources, the duration of the envelope is typically of a few tens of femtoseconds (1 femtosecond=$10^{-15}$s) which is a duration typically greater than the period of the optical cycle in the near and mid-infrared. At 800 nm, for example, the optical cycle is 2.7 femtoseconds.

For certain applications, pulses of a duration less than or equal to the optical cycle—hereinafter referred to as impulsions sub-cycles—are advantageous. The electrical field is then a transient field, which is a condition favourable to high harmonic generation X-UV in gases or solids. Such pulses make it possible, in particular, to effectively generate attosecond pulses of which the duration can reach a few tens of attoseconds (1 attosecond=$10^{-18}$s) ("Tailoring a 67 attosecond pulse through advantageous phase-mismatch", K. Zhao et al, Optics Letters 37, 3891-3893 (2012).)

The generation and the amplification of optical pulses of a sub-cycle duration is however difficult due to the associated spectral band. A sub-cycle pulse required in fact a spectral support that corresponds to about one octave. In other words, the spectrum of a sub-cycle pulse of which the carrier is at the optical frequency $\upsilon_0$ must cover at least the spectral range [0.5 $\upsilon_0$, 1.5 $\upsilon_0$]. Such bands are typically greater than what the laser mediums permit and use must be made of complex non-linear amplification techniques.

Moreover, in order to be able to be used experimentally, it is preferable that the envelope of the pulses be perfectly synchronised with the phase of the optical carrier. The stabilisation and the control of the relative phase between the envelope and the carrier (phase designated by the acronym CEP for Carrier-Envelope Phase) are indeed necessary for the electrical field to retain its properties from one pulse to another. The stabilisation of the CEP requires elaborate and expensive devices of which the implementation is often complex.

For example, the publication "High-energy pulse synthesis with sub-cycle waveform control for strong-field physics" by S-W Huang et al. (Nature Photonics 5, 475-479 (2011)) describes a source concept comprising an ultrafast pulse generator of which the CEP phase is actively stabilised, a device for extending the spectrum of these pulses into the infrared, two pulse shapers, two series of optical parametric amplifiers non-collinearly pumped by two pump wavelengths and a phasing system controlled by a measuring device based on cross-correlation detection.

The object of the invention is to propose a device allowing for the generation of optical CEP-stable pulses with sub-cycle durations by means of an optical parametric amplifier with frequency drift modified in such a way as to not require an initial spectrum covering the octave, or a process for spectral widening of the octave, or an active stabilisation of the CEP. The master idea of the invention is based on the coherent synthesis and the co-amplification of two harmonic spectral bands.

The invention has for objects a system for generating short optical pulses of a duration shorter than the period of the optical carrier using the principle of the parametric amplification and comprising:
   a first generator of optical pulses outputting pulses with a wavelength substantially equal to $\lambda/2$ and a spectral width less than $\lambda/3$;
   a second generator of optical pulses outputting pulses of a duration less than 10 picoseconds at a wavelength substantially equal to $\lambda/3$,
   a device for collinearly recombining the pulses from the first and second optical pulse generators;
   a first parametric amplification device receiving the output of said recombination device as input;
   a filter extracting from the output of the first parametric amplification device a band centred about a wavelength substantially equal to $\lambda$;
   a second harmonic generator receiving the output of said filter as input and generating a band centred about a wavelength substantially equal to $\lambda/2$;
   a programmable device for controlling the delay and the spectral phase making it possible to temporally adjust the pulses corresponding to said bands, in such a way as to allow for the generation, by constructive interference, of a pulse with a wavelength substantially equal to $\lambda/3$ and of a duration less than the period of the optical cycle.

Such a system can further comprise a dispersive device carrying out a compression and bringing the pulses from the programmable device to their minimum duration.

This system can comprise a parametric amplification device receiving the uncompressed pulses from the programmable device. One or each programmable device for controlling the delay and the spectral phase can be an acousto-optic programmable dispersive filter.

The system according to the invention can further comprise a pump source for one and/or the other of the generators, with said pump source comprising preferably means of amplification by materials doped with Erbium ions.

According to a first embodiment, the first generator is obtained using the pump source by a non-linear optical process.

According to a second embodiment, the second generator is obtained using the pump source by a non-linear optical process.

When the generators comprise independent sources, the system can advantageously comprise means for synchronising the pulses from the first and second generators.

Figure 2:
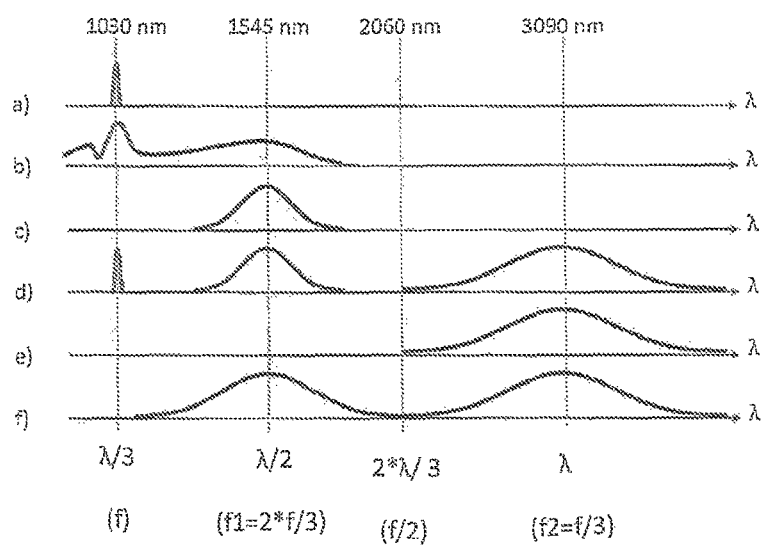

A method of implementing a device according to the invention is described hereinafter, by way of non-limiting examples, with reference to the annexed drawings wherein:
   FIG. 1 diagrammatically shows the structure of the optical system according to the invention; and,
   FIG. 2 shows the spectra obtained at various locations of the system of FIG. 1.

The amplification of ultrafast laser pulses via parametric effect is described in literature. A "signal" pulse, with central optical frequency f1, interacts in a material having non-linear optical properties with a higher power pulse ("pump" pulse") and with optical frequency f. The frequency content of the "signal" pulse must be wide in order to allow for the production of ultrafast pulses, the "pump" pulse generally being of a narrower spectral band. During the interaction, a portion of the energy of the "pump" pulse is transferred to the "signal" pulse which is amplified. Simultaneously, a third pulse is generated and co-amplified. This third pulse is designated by the term "idler" and the relations for energy conservation impose on this pulse to have as a central frequency f2=f−f1. The "phase tuning" constraint also imposes that the CEP of the "idler" pulse be equal, to within a constant, to the difference between the CEPs of the "pump" and "signal" pulses. If this difference is constant in a repeatable manner (i.e. from one pulse to another), then the CEP of the "idler" pulse is stable over time, even if neither the "pump" pulse or the "signal" pulse have this property.

A remarkable choice for the optical frequency for the signal pulse is f1=2*f/3. Indeed, in this particular case, the optical frequency of the "idler" pulse is f2=f−f1=f/3=f1/2. The optical frequency f1 of the "signal" pulse is then the exact harmonic of the "idler" pulse, of frequency f2. This choice of optical frequencies is hereinafter referred to as "3-2-1" in reference to the values of the of the optical wavelengths of the "pump", "signal" and "idler" pulses (respectively λ/3, λ/2 and λ if λ is the wavelength of the "idler").

For the generating of high power pulses, the principle of the parametric amplification is combined with that of drift frequency amplification which consists in temporally extending the "signal" pulse and the "pump" pulse in order to reduce the instant power, with the amplified "signal" being recompressed later in order to obtain a short pulse. This is drift frequency parametric amplification, designated by the acronym OPCPA (Optical Parametric Chirped Pulse Amplification). At the output of the optical parametric amplifier, the "idler" pulse has a frequency drift that is, in the particular case of a quasi-monochromatic "pump" or with a spectral width less than that of the "signal", a sign opposite that of the "signal" pulse. It is therefore not possible, in general, to use the single same device to recompress the "idler" pulses. In practice, it would be necessary to geometrically separate the "signal" and "idler" beams, to recompress them separately then to recombine them coherently. These operations are not trivial, have technical difficulties and major complexity and have not, as far as we know, been the subject of a publication. Moreover, the spatial separation of the beams would reintroduce possible sources of fluctuation in the relative phase between the "signal" and "idler" pulses, which complicates all the more so their recombining.

This invention is placed in the context of an OPCPA architecture of the "3-2-1" type comprising at least two parametric amplifiers and for which the "signal" and "pump" pulses have a CEP difference that is over time. The invention introduces two additional devices into the OPCPA architecture:
on the one hand, a stage of second harmonic generation inserted between two optical parametric amplifiers,
on the other hand, a device for reversing the sign of the frequency drift and phase.

The stage of second harmonic makes it possible to generate using the "idler" pulse from the first parametric amplifier (with optical frequency f1/3) a pulse with optical frequency 2*f1/3 which is identical to the optical frequency of the "signal" pulse of the first parametric amplifier. This identity is the direct result of the choice of "3-2-1" frequencies and makes it possible to continue the parametric amplification in the following amplification stages. As the "idler" pulse is CEP-stable, the "idler" pulse doubled in frequency is also and the CEP difference between the latter is also stable over time. A phase tuning of type 0 in addition allows the second harmonic to be polarised linearly like the "idler" pulse. The combination of the "idler" pulse and of its harmonic therefore has all of the properties sought: a spectral width greater than the octave, spatial and spectral coherency, a stable CEP. The harmonic pulses form a single pulse that can be described as a pulse with an optical carrier f/2 and spectral width >f/3. If the spectral width of the starting "signal" pulse is, for example, f/6 then the combined harmonic pulses cover a spectral width of f/2 which is a full octave with respect to the optical carrier.

In order to proceed with the amplification of these pulses it is necessary to tune the frequency drifts, the delays and the absolute phases between these two bands with a precision in the delay of about one fraction of an optical period, typically much less than 1 fs. This ultra-precise operation can advantageously be carried out using a programmable dispersive device such as an acousto-optic programmable dispersive filter (AOPDF).

Light sources that combine a parametric amplifier with external non-linear optical devices such as a second harmonic generator or a frequency difference generator with the purpose of increasing the range of frequencies that can be covered have been described in literature (Miller et al., PCT WO 2005/112207 A1).

This invention uses such a combination, but it can be distinguished in particular from Miller et al in that:
the invention allows for the co-amplification of the pulses with frequency f2 and 2*f2 in the same single parametric amplifier: same "pump" pulses, same polarisation, same direction of propagation, same type of non-linear crystal,
the invention does not require a starting "signal" pulse that has a spectral width approaching or covering the octave; indeed, the invention makes it possible to generate the octave using a more reduced spectral width,
the generation of the second harmonic is essential: it is not used to increase the spectral coverage of the invention.

If the source of the "signal" at the frequency f1 were independent of the "pump" laser at the frequency f, the carrying out of the invention would require a complex synchronisation mechanism between these two laser sources, in order to ensure that they are simultaneously present in the parametric amplifier. A preferred embodiment of the invention consists therefore in generating, for example, the source of the "signal" using the "pump" pulse, according to a procedure described for example by Cerullo et al. ("Ultrafast optical parametric amplifiers", Rev. Sci. Instrum. 74, 1 (2003)). Several mechanisms with a non-linear optical base are known for generating a wide band pulse, referred to as a supercontinuum, using an intense pulse of a narrower spectral band and with a different central frequency. This is for example the non-linear interaction with the glass in an optical fibre, the non-linear interaction with a solid crystal or the interaction with a gas in a hollow fibre. An interaction of this type will be used in order to generate using the "pump" of frequency f a wide spectrum pulse including the frequency 2*f/3. A spectral filter can extract from this wide spectrum the frequencies intended to form the "signal" pulse which is then amplified by the parametric amplifier.

A second possibility is to generate the "pump" source using a "signal" pulse by an equivalent mechanism: a non-linear interaction is used to generate using the "signal" with frequency 2*f/3 a wide spectrum pulse including the frequency f. A spectral filter extracts from this wide spectrum the frequencies intended to form the "pump" pulse which is then amplified by laser power amplifiers.

A third possibility, described, for example, by Adachi et al. ("1.5 mJ, 6.4 fs parametric chirped-pulse amplification system at 1 kHz", Optics Letters, Vol. 32, Issue 17, pp. 2487-2489 (2007)) is to use a source that generates pulses that have a spectral band that covers both the frequency f and the frequency 2*f/3. A spectral filter extracts from this initial wide spectrum a frequency interval which is then amplified by laser power amplifiers and finally converted by second harmonic generation in order to form the "pump" pulse. A second spectral filter extracts from the initial wide spectrum the frequencies intended to form the "signal" pulse which is then amplified by the parametric amplifier.

In sum the principle of the invention makes it possible, using a "pump" pulse with a narrow spectrum and frequency f and a synchronous "signal" pulse with a wide spectrum centred at the frequency f1=2*f/3, to generate and amplify a wide spectrum pulse at f/3 at the optical frequency f/2. This generation is provided by the following elements:
- a parametric amplification stage that creates, via frequency difference, a wave complementary to the frequency f2=f−f1,
- the band filtering around f2=f−f1 and the generating of a second harmonic 2*f2=f1 via a phase tuning of type 0,
- the turning over and the adjustment of the frequency drift of the pulse at the frequency 2*f2 so that this pulse interferes constructively with the pulse at the frequency f2 in the final compressor.

In addition, the "3-2-1" choice, which is an essential character of the invention, guarantees that the pulses at frequencies f2 and 2*f2 can be co-amplified in the following parametric amplification stages using the same "pump" pulses as for the first parametric amplification stage.

The invention shall be better understood by considering the following example embodiment shown in FIG. 1. The pump source P is constituted by a chain of generation and amplification of pulses with a base of amplifying materials containing Ytterbium ions. It emits intense pulses with a wavelength of $\lambda/3$, corresponding to the frequency f. In the example shown, $\lambda/3$=1030 nm. The optical output of this source is divided by a separator BS into beams injected respectively into three arms B1, B2 and B3. The beam of the first arm B1 is focussed in a YAG SC crystal making it possible to generate a supercontinuum that covers at least the range 1300-1900 nm. The output of this supercontinuum is used as a "signal" channel.

The beam of the second arm B2 is centred on the wavelength $\lambda/3$ and the frequency f. The second arm B2 is used as a "pump" channel.

The beams from the first arm B1 and from the second arm B2 are combined collinearly in a first recombination device R1 and injected into a first optical parametric amplifier OPA1 that carries out the frequency difference function. Advantageously, the "signal" pulse was modified, with recombining, by a first device for controlling the delay and the phase DCDP1 in order to obtain an optimum temporal overlapping of the pulses of the first and second arms B1, B2, in order to optimise the drift frequency parametric amplification mechanism. A first filter F1 is advantageously arranged between the output of the supercontinuum SC and the first device for controlling the delay and the phase DCDP1, in order to select a "signal" centred on the frequency $\lambda/2$=1545 nm corresponding to the frequency f1.

Advantageously, the first optical parametric amplification device OPA1 has a MgO-doped Lithium Niobate crystal base, of which the polarisation is periodically inverted ("Periodically Poled Lithium Niobate"). This type of device provides a quasi phase tuning between the pulses with a wavelength $\lambda/3$ at 1030 nm and those comprised in the band 1300-1900 nm, allowing for the amplification over a wide spectrum band and in collinear configuration with a "signal" centred on the wavelength $\lambda/3$=1545 nm.

An "idler" output centred on wavelength $\lambda$=3090 nm is selected by a second filter F2. The filter F2 is as such provided to extract from the output of the first amplifier OPA1 a band centred about a wavelength substantially equal to $\lambda$. In the example shown, this filter F2 is constituted of one or several dichroic mirrors.

The output of the filter F2 is injected into a non-linear crystal SH, also of the MgO:PPLN type, operating as a second harmonic generator.

A second device for controlling the delay and the phase DCDP2 controls the delay and the phase of the spectral components from the crystal SH. The "idler" and its harmonic interfere to form a pulse of which the average optical wavelength is centred on 2*$\lambda/3$=2060 nm, corresponding to a frequency equal to f/2. If the spectrum of the "signal" covers the range 1300-1900 nm then the "idler" and its second harmonic cover the entire spectral range 1125-4345 nm and this spectrum supports a pulse of sub-cycle duration.

The beam of the third arm B3 is centred on the wavelength $\lambda/3$ and the frequency f. The third arm B3 is also used as a "pump" channel.

A second recombination device R2 combines in a quasi-collinear manner the beam formed by the output of the second device for controlling the delay and the phase DCDP2 with the beam of the third "pump" arm B3 and directs the combined beams to a second optical parametric amplifier OPA2. This amplifier is of the same type as the first OPA1. It increases the power of the pulse from the second device for controlling the delay and the phase DCDP2. Finally, a dispersive system C constituted, for example, of a thick blade of Silicon makes it possible to compress the pulses to their minimum duration and forms a pulse with sub-cycle duration.

FIG. 2 diagrammatically shows the spectra obtained in the various steps of the system of FIG. 1:
- The spectrum 2a is the spectrum of the pump source P;
- The spectrum 2b is the spectrum of the supercontinuum at the output of the crystal Sc;
- The spectrum 2c is the spectrum obtained at the output of the first filter F1;
- The spectrum 2d is the spectrum obtained at the output of the first parametric amplifier OPA1;
- The spectrum 2e is the spectrum obtained at the output of the second filter F2; and
- The spectrum 2f is the spectrum obtained at the output of the second harmonic generator SH.

It is obvious that the pulses from the arms B1 and B2 before the recombining R can be, without loss of generality, from two synchronous optical sources, wherein one of which is represented by the pump source P.

The invention claimed is:
1. System for generating short optical pulses of a duration shorter than a period of an optical carrier using a principle of parametric amplification, which comprises:
- a first generator of optical pulses (P, B1) outputting pulses with a wavelength substantially equal to $\lambda/2$ and a spectral width less than $\lambda/3$;
- a second generator of optical pulses (B2) outputting pulses of a duration less than 10 picoseconds at a wavelength substantially equal to $\lambda/3$;

a device (R1) for collinearly recombining the pulses from the first and second optical pulse generators;

a first parametric amplification device (OPA1) receiving an output of the said recombination device (R1) as input;

a filter (F2) extracting from the output of the first parametric amplification device (OPA1) a band centered about a wavelength substantially equal to $\lambda$;

a second harmonic generator (SH) receiving an output of said filter (F2) as input and generating a band centered about a wavelength substantially equal to $\lambda/2$; and a programmable device for controlling a delay and a spectral phase (DCDP2) making it possible to temporally adjust the pulses corresponding to said bands, in such a way as to allow for the generation, by constructive interference, of a pulse with a wavelength substantially equal to $\lambda/3$ and of a duration less than a period of an optical cycle.

2. Device according to claim 1, further comprising a dispersive device (C) carrying out a compression and bringing the pulses from the programmable device (DCDP2) to their minimum duration.

3. System according to claim 2, further comprising a second parametric amplification device (OPA2) receiving uncompressed pulses from the programmable device (DCDP2).

4. System according to claim 2, wherein said programmable device for controlling the delay and the spectral phase (DCDP2) is an acousto-optic programmable dispersive filter.

5. System according to claim 2, further comprising a pump source (P) for the generators, with said pump source comprising preferably means of amplification by materials doped with Erbium ions.

6. System according to claim 1, further comprising a second parametric amplification device (OPA2) receiving uncompressed pulses from the programmable device (DCDP2).

7. System according to claim 6, wherein said programmable device for controlling the delay and the spectral phase (DCDP2) is an acousto-optic programmable dispersive filter.

8. System according to claim 6, further comprising a pump source (P) for the generators, with said pump source comprising preferably means of amplification by materials doped with Erbium ions.

9. System according to claim 1, wherein said programmable device for controlling the delay and the spectral phase (DCDP2) is an acousto-optic programmable dispersive filter.

10. System according to claim 9, further comprising a pump source (P) for the generators, with said pump source comprising preferably means of amplification by materials doped with Erbium ions.

11. System according to claim 1, further comprising a pump source (P) for the generators, with said pump source comprising preferably means of amplification by materials doped with Erbium ions.

12. System according to claim 11, wherein the first generator is obtained using the pump source (P) by a non-linear optical process (B1).

13. System according to claim 11, wherein the second generator is obtained using the pump source (P) by a non-linear optical process.

14. System according to claim 1, further comprising means for synchronising the pulses from the first and second generators.

* * * * *